(12) United States Patent
Milleker et al.

(10) Patent No.: US 6,523,042 B2
(45) Date of Patent: *Feb. 18, 2003

(54) SYSTEM AND METHOD FOR TRANSLATING TO AND FROM HIERARCHICAL INFORMATION SYSTEMS

(75) Inventors: William N. Milleker, Riverside, IL (US); Dhananjay M. Joshi, Wilmette, IL (US); Jay Phillips, Chicago, IL (US); Morrisha L. Hudgons, Chicago, IL (US)

(73) Assignee: Accenture LLP, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/479,840

(22) Filed: Jan. 7, 2000

(65) Prior Publication Data

US 2002/0169741 A1 Nov. 14, 2002

(51) Int. Cl.[7] .............................................. G06F 17/30
(52) U.S. Cl. ..................... 707/102; 707/100; 707/103; 707/203; 707/205; 707/1; 707/2
(58) Field of Search .................... 703/2; 713/1; 717/1; 345/807, 748; 707/2, 1, 100, 103, 102, 203, 205

(56) References Cited

U.S. PATENT DOCUMENTS

| | | | |
|---|---|---|---|
| 5,331,579 A | | 7/1994 | Maguire et al. ............... 703/2 |
| 5,613,122 A | | 3/1997 | Burnard et al. ................ 713/1 |
| 5,630,131 A | | 5/1997 | Palevich et al. ............... 717/1 |
| 5,642,511 A | | 6/1997 | Chow et al. .................... 717/1 |
| 5,655,118 A | * | 8/1997 | Heindel et al. ............. 707/103 |
| 5,664,177 A | * | 9/1997 | Lowry ......................... 707/100 |
| 5,737,559 A | | 4/1998 | Orton et al. ................ 345/807 |
| 5,812,995 A | * | 9/1998 | Sasaki et al. ................... 707/1 |
| 5,838,965 A | | 11/1998 | Kavanagh et al. .......... 707/103 |
| 5,842,213 A | * | 11/1998 | Odom et al. ................ 707/100 |
| 5,945,992 A | | 8/1999 | Cunniff ....................... 345/748 |

* cited by examiner

*Primary Examiner*—Charles Rones
*Assistant Examiner*—Thuy Pardo
(74) *Attorney, Agent, or Firm*—Brinks Hofer Gilson & Lione

(57) ABSTRACT

A method for translating to and from an hierarchical information system, comprises identifying a non-hierarchical information system containing information stored in a non-hierarchical manner; developing a translation map that identifies organizational and content based rules for translating the non-hierarchical information into an hierarchical information system; and translating the non-hierarchical information for storage into the hierarchical information system according to the rules for translating.

34 Claims, 3 Drawing Sheets

SYSTEM AND METHOD FOR TRANSLATING TO AND FROM HIERARCHICAL INFORMATION SYSTEMS

COPYRIGHT REFERENCE

Two Appendices are included on a CD-ROM in this application that contains material that is subject to copyright protection, which is hereby incorporated by reference. The CD-ROM includes the files: 1. 10022-11 Revised Appendix A.Doc, created Dec. 4, 2001, with a size of 7,040 kilobytes and 2. 10022-11 Appendix B.doc, created Dec. 6, 2001, with a size of 509 kilobytes.

BACKGROUND OF THE INVENTION

The present invention relates to a system and method for translating information, to or from, an hierarchical information system.

Legacy systems are systems that support business function, many of which have been in use for many years. These systems usually store information, and communicate with each other, using non-hierarchical information systems, such as linear strings (i.e. legacy messages).

Modern systems often use an hierarchical system to store information and communicate with each other. Hierarchical system typically store information in a tree structure of objects, each object having specific attributes, and where each object may be linked to other objects. XML (Extensible Markup Language) is an example of an hierarchical system.

The need arises for an interface to translate information between systems. Simple systems that translate between linear strings are well known. However, there is a need for products that can read the objects of an hierarchical system and perform the required data transformations. MERCATOR, for example, could be used if first the object model were translated into a standard, predictable data stream. However, the effort to translate the object model into this intermediate format is similar to the effort required to translate the object model into a form directly usable by the legacy system. In addition, MERCATOR is implemented as a single-threaded DLL (Dynamic Linked Library) in Windows NT, which may have an adverse impact on overall system performance and throughput.

BRIEF SUMMARY OF THE INVENTION

A first aspect of the invention is a method for translating to and from an hierarchical information system, comprising identifying a non-hierarchical information system containing information stored in a non-hierarchical manner; developing a translation map that identifies organizational and content based rules for translating the non-hierarchical information into an hierarchical information system; and translating the non-hierarchical information for storage into the hierarchical information system according to the rules for translating.

A second aspect of the invention is computerized method for translating to and from an hierarchical information system.

A third aspect of the invention is a system for translating to and from an hierarchical information system, comprising means for identifying a non-hierarchical information system containing information stored in a non-hierarchical manner; means for developing a translation map that identifies organizational and content based rules for translating the non-hierarchical information into an hierarchical information system; and means for translating the non-hierarchical information for storage into the hierarchical information system according to the rules for translating.

A fourth aspect of the invention is a system for translating to and from an hierarchical information system, comprising a first computer system having a memory for storing information in an hierarchical information system; an interface coupled to the first computer system, the interface having means for identifying a non-hierarchical information system containing information stored in a non-hierarchical manner, developing a translation map that identifies organizational and content based rules for translating the non-hierarchical information into an hierarchical information system, and translating the non-hierarchical information for storage into the hierarchical information system according to the rules for translating; and a second computer system coupled to the interface, the second computer system having a memory for storing information in a non-hierarchical information system.

A fifth aspect of the invention is a method for translating to and from an hierarchical information system, comprising translating data from an object model into a legacy message.

A sixth aspect of the invention is a method for translating to and from an hierarchical information system, comprising translating data from a legacy message model into an object.

A seventh aspect of the invention is a method for translating to and from an hierarchical information system, comprising identifying an hierarchical information system containing information stored in an hierarchical manner; developing a translation map that identifies organizational and content based rules for translating the hierarchical information into an non-hierarchical information system; and translating the hierarchical information for storage into the non-hierarchical information system according to the rules for translating.

An eighth aspect of the invention is a computerized method for translating to and from an hierarchical information system, comprising identifying an hierarchical information system containing information stored in an hierarchical manner; developing a translation map that identifies organizational and content based rules for translating the hierarchical information into an non-hierarchical information system; and translating the hierarchical information for storage into the non-hierarchical information system according to the rules for translating.

A ninth aspect of the invention is a system for translating to and from an hierarchical information system, comprising means for identifying an hierarchical information system containing information stored in an hierarchical manner; means for developing a translation map that identifies organizational and content based rules for translating the hierarchical information into a non-hierarchical information system; and means for translating the hierarchical information for storage into the non-hierarchical information system according to the rules for translating.

A tenth aspect of the invention is a system for translating to and from an hierarchical information system, comprising a first computer system having a memory for storing information in a non-hierarchical information system; an interface coupled to the first computer system, the interface having means for identifying an hierarchical information system containing information stored in an hierarchical manner, developing a translation map that identifies organizational and content based rules for translating the hierarchical information into a non-hierarchical information system, and translating the hierarchical information for storage into the non-hierarchical information system according to the rules for translating; and a second computer system coupled to the interface, the second computer system having a memory for storing information in an hierarchical information system.

BRIEF DESCRIPTION OF THE DRAWINGS

These and other features and advantages of the invention will become apparent upon a review of the following detailed description of the presently preferred embodiments of the invention, when viewed in conjunction with the appended drawings.

DETAILED DESCRIPTION OF THE INVENTION

The present invention includes an interface that supports the specific data transformation requirements of translating information from a specific hierarchical system (also referred to as an object model), such as XML data, into a non-hierarchical system, such as linear strings (i.e., custom legacy messages), or into a different specific hierarchical system. The interface performs the mapping, lookups and derivations necessary to format legacy messages in a manner consistent with the legacy applications.

Figure 1:
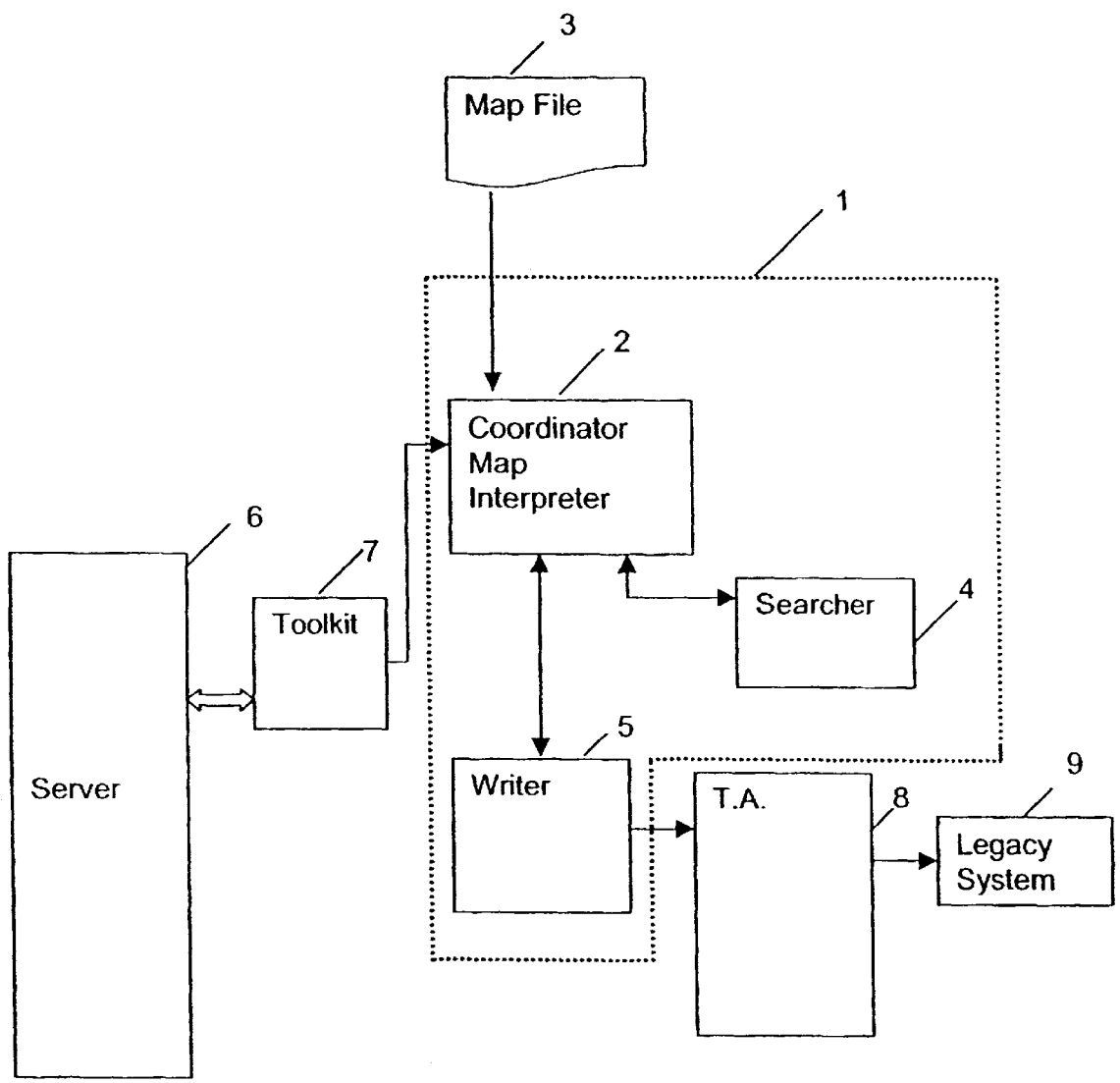
FIG. 1 shows the application architecture and components of an interface.
Figure 2:
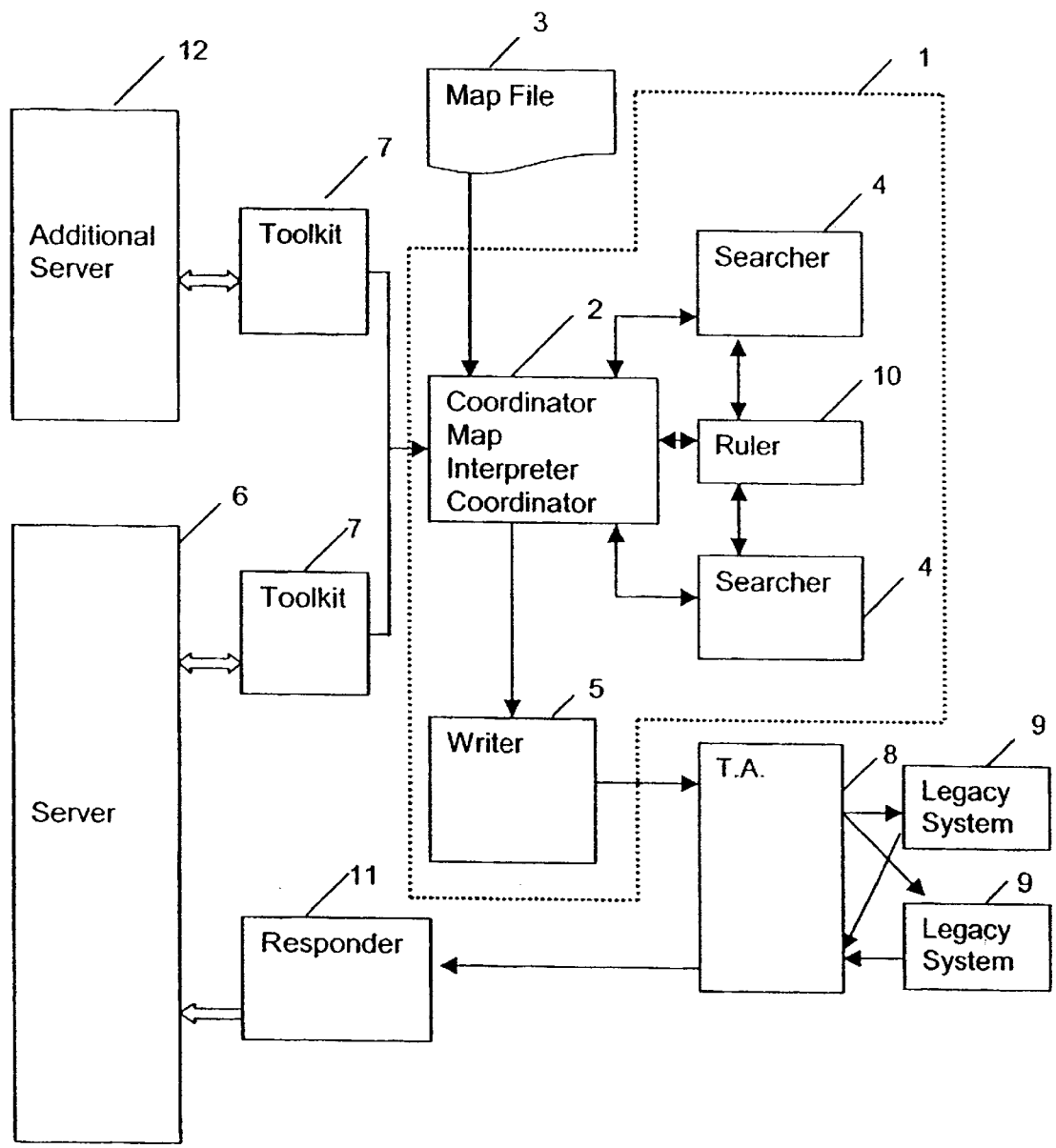
FIG. 2 shows the application architecture and components of another interface.

The application architecture and components of the interface are shown in FIG. 1. The components, and additional optional components, are shown in FIG. 2. As will be apparent to those of ordinary skill in the art, the interface may be software implemented on a general purpose computer, or may be dedicated hardware, or a combination thereof. Furthermore each individual component may be software implemented on a general purpose computer, or may be dedicated hardware, or a combination thereof. All components of the interface are described first, followed by a section describing the application flow. A subsequent section includes a summary of the data transformations supported by the interface.

As schematically shown in FIG. 1, the interface 1 includes a coordinator 2, a searcher 4, and a writer 5. Also shown in the figure are a map file 3, a toolkit 7, a technical architecture framework 8, a legacy system 9, and a server 6.

In addition to those parts shown in FIG. 1, FIG. 2 schematically shows another server 12 that may use a different object model, a toolkit 7' for this different object model, a searcher 4' for this different object model, a second legacy system 9, a ruler 10, and a responder 11.

The map file defines the attributes that are to be obtained from the object or IDL (interface definition language) structure and used in the construction of legacy messages. The map file defines the attribute location (in each object in the object model), the format of the attribute values as they should appear in the legacy message, and the order in which the attribute values should appear in the legacy message. The map file may be viewed as a series of commands, which instruct the coordinator on how to construct the legacy message from the objects.

The coordinator controls the process of reading the map file and using the searcher and optional ruler to obtain information to send to the writer. The coordinator orchestrates the translation, resolution, derivation, message construction, and message delivery processes. The coordinator includes a map interpreter, which interprets the commands in the map file. Preferably the coordinator is developed using JAVACC, a SUN MICROSYSTEMS product. Given a grammar that describes the syntax used in the map file, JAVACC can be used to create the coordinator and allow map files to contain commands that access the searcher, ruler and writer.

The searcher provides an interface that is used by the coordinator and the ruler to obtain attribute information within each object. The coordinator uses commands from the map file to translate data (attributes) from an object model to the legacy system attributes. The coordinator executes rules as they are read from the map file. The coordinator uses the searcher to locate attributes used in a command. For example, if a command requires a calculation using attributes in an object, the coordinator would use the searcher to obtain these attributes and perform the calculation.

The writer formats attributes passed by the coordinator and uses them to the construct the message that is sent to the legacy system.

The optional responder returns confirmations from the legacy system to the system that initiated the transaction. If the initiating system is a server, the responder converts the legacy response to an XML message. For example, systems using the IDL interface will receive responses in the form of IDL structures.

The following is an example of how the system shown in FIG. 2 may operate. A request is made of the interface via a CORBA IDL interface. Upon receipt of the request, the interface creates a new coordinator passing either the XML string or the IDL defined structure, and starts the coordinator.

The coordinator creates a new searcher, passing in the object model to be searched. The coordinator creates a new ruler, passing in the previously created searcher. The ruler will use the searcher if necessary during execution of its rules.

The coordinator then requests the target system identifier (e.g. legacy system) of the searcher. The coordinator will create a new writer, passing the target system identifier. The target system identifier is required so that the writer deposits the constructed message on the appropriate legacy queue.

The coordinator requests the map file of the map loader. If the map loader has the requested map file cached, the memory-resident map file is returned to the coordinator. If the map is not loaded, the map loader loads it and returns it to the coordinator. The map loader is an optional component that only carries out this function, and advantageously prevents the need to reload map files that have been previously loaded.

The coordinator (via the map interpreter) reads the map file and determines that an attribute from an object model is needed. The coordinator (via the map interpreter) makes a request of the searcher to get the needed attribute information. The searcher finds and returns the requested attribute.

The coordinator (via the map interpreter) tells the writer to add the obtained attribute information to the message under construction. The writer formats the attribute information as defined by the map file and then appends the formatted attribute to the message under construction.

The coordinator reads the map file and may encounter a command that invokes a rule. In this case, the coordinator makes a request of the ruler to execute the specified rule. The ruler makes a request of the searcher to get, if necessary, attribute information needed during execution of the rule. The searcher finds and returns the requested attribute. The coordinator tells the writer to add the obtained attribute information to the message under construction. The writer formats the attribute information as defined by the map file and then appends the formatted attribute to the message under construction.

At the end of the map file, the coordinator tells the writer to complete the message under construction and to send it to the appropriate legacy system. The writer makes a request of the technical architecture (also referred to as an underlying architecture) to package the message, for example, as a queued message (for IBM MQ Series, or MICROSOFT MSMQ), and deposit it on the appropriate legacy system queue. The technical architecture creates a new message using the application-defined message content and deposits the message on the appropriate legacy queue.

In a preferred embodiment, the memory address of each object is retained as a legacy message is constructed, reducing the time necessary for the reading of additional attributes needed to construct the legacy message.

Figure 3:
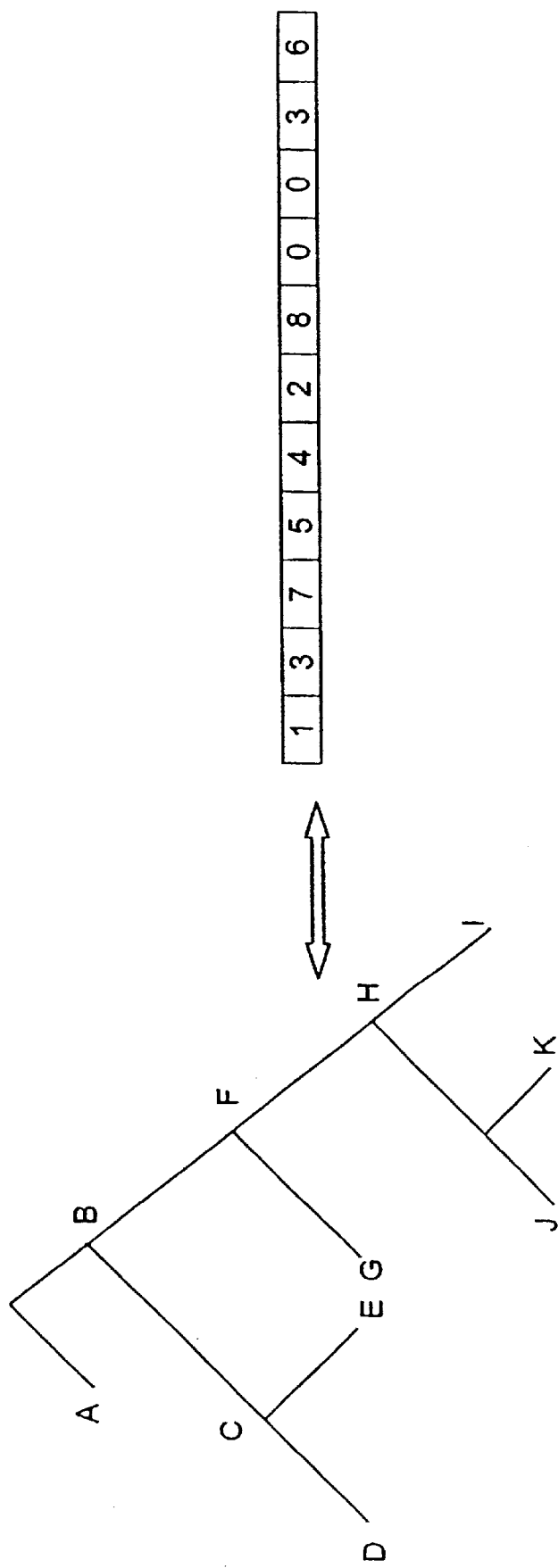
FIG. 3 is an illustration showing the transformation of attributes from an hierarchical system to a non-hierarchical system, and the reverse.

FIG. 3 is an illustration showing the transformation of attributes (data) from an hierarchical system (left) to a non-hierarchical system (right), which in this illustration is a linear string. The individual attributes of the objects in the hierarchical system are represented by letters, while attributes in the linear string are represented by numbers. The interface can read the attributes of the objects, and translate them (from letters to number in this illustration), and write them into a linear string. The linear string may then be passed to a legacy system. As illustrated, the reverse is also possible.

Once the message has been processed by the legacy system, an optional response is returned to the technical architecture via a message queue. The technical architecture retrieves the message from the queue and creates an optional responder. The technical architecture passes the data portion of the message to the responder and instructs the responder to execute the process of returning the response.

The responder creates an object and populates the object with data (attributes) expected by the server. This data includes attributes such as a group identifier that is generated by the legacy system, for example group enrollment of an insurance plan. In the case where the object model is XML, once the object has been populated, the responder creates an XML message. The responder queries the Proxy Pool Manager for a secure proxy to the appropriate server. The responder then uses the secure proxy to send the XML message response to the server.

If, after a predefined number of tries, the proxy cannot be used to send the results to the server, a return code is passed back to the technical architecture and the message is sent to a resend queue to be delivered at a later time. Once the response has been successfully delivered to the server, a return code is passed back to the technical architecture and the message is deleted from the queue.

The application architecture is designed to handle the following. categories of data transformations: simple mapping, constants, code lookups, derived rule, multiple source locations (plan modeling), and rate information fields (when the data contains information relating to a service, such as insurance).

Simple mapping means mapping fields that can be mapped directly from an object attribute to a legacy message field without any additional mapping logic.

Constants are fields in the legacy message that are required and are always populated with the same information. For example, a field that describes the type of transaction would always contain an 'E' for electronic since the framework is an electronic means of creating the message.

Code lookups are fields that require a translation from how an attribute is described in the hierarchical system, and how the same attribute is described in a legacy message.

A derived rule is a field that is extracted from the object model and translated to the legacy message fields based on rules (such as business rules) as defined in the ruler.

Multiple source locations are fields that involve the same process of a simple map. However, the source attribute may be located in different areas of the Vendor object model.

Rate information fields are fields that are a specialized form of derivation rules that use name/value pairs. Unlike basic derived fields that rely on class names to find attributes in the object model, data values are used to search for rate attributes in the object model.

The map file contains commands, which are defined in the order that the legacy message needs to be constructed. The following are examples of the script used for the different categories of data translations contained in a map file:

Simple Mapping:
```
write (search (case.member:CompanyName), "s30");
write (search (case.member:SubscriberNumber), "s9");
write (search (case.application:Deposit), "s10");
write (search (case.application:SubjectToErisa), "s1");
write (search (case:CaseInstallationID), "s20");
```
Use of Constants:
```
write (" ", "s5");
write ("00000", "s5");
write ("H", "s1");
write ("999999", "s6");
write ("01", "s2");
```
Value Lookup:
```
table trans_table{
   "1", "0"; //None
   "2", "1"; //Life
   "3", "3"; //Health
   "4", "2"; //Both
   default, "*";
};
string sval, lval;
sval=search
   (case.caseinstallation:RetiredCoverageType);
lval=lookup (trans_table, sval);
write (lval, "s1");
release (trans_table);
```
Derived Values:
```
if (search (case:PriorEffectiveDateCoverage)==" ")
   sval="N";
else
   sval="Y";
write (sval, "s1");
```
Occurrences:
```
int i, j;
i=count (case.member);
j=1;
while (j<=i)
{
```

```
write (search (case.member(j):City), "s15");
write (search (case.member(j):State), "s2");
j=j+1;
}
Other Operations:
//specialrule7 is defined in the Business Ruler class
write (ruler (specialrule7)), "s30");
i=stringlength (sval);
Ival=midstring (sval, pos, length);
i=tointeger (sval);
```

The data from hierarchical information system may be sent to the interface from a specific vendor's server, where the vendor may be the same or different from the owner or user of the legacy system. Furthermore, multiple vendors, each having one or more servers, each containing data in one or more hierarchical systems, may send data to the interface. The interface may translate the data into a non-hierarchical system, such as a legacy system, or a different hierarchical system. Examples of hierarchical systems include XML and ChannelPoint (CP XML).

Specifically, the interface may carry out one or more of the following:

Retrieve values (data) from Vendor object model, using the Vendor toolkit (note: this model is not static between invocations).

Concurrently support a different, dynamic map file for each legacy system output format.

Support simultaneous access from server components.

A toolkit is used to interpret the hierarchical system data exported from a server to the interface. Each toolkit may be specific to each hierarchical system, for example the MICROSOFT XML toolkit is specific to XML. On receipt of the exported hierarchical system data stream, the toolkit creates a copy of the original object (or objects). Data is then read out of this object (or objects) for translation into a custom legacy message.

The present invention interface has a number of advantages:

Adaptability to different legacy systems, including future systems.

Extensibility to other applications requiring access to legacy systems.

Maintainability and streamlined operational capability.

Scalability to handle production-level volume requirements.

Performance requirements to support multiple servers, using multiple Vendors.

Re-usability to reduce complexity and implementation timeline.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

What is claimed is:

1. A method for translating to and from a hierarchical information system, comprising:

identifying a non-hierarchical information system containing non-hierarchical information stored in a non-hierarchical manner;

receiving the non-hierarchical information into an interface;

utilizing the interface to read a map file to determine an attribute of the non-hierarchical information;

developing a translation map that identifies organizational and content based rules for translating the non-hierarchical information into hierarchical information based on the attribute;

adding the attribute to the non-hierarchical information by utilizing the interface, wherein the adding comprises: formatting the attribute as defined by the map file and then appending the formatted attribute to the non-hierarchical information;

in response to reading the attribute translating the non-hierarchical information into the hierarchical information;

transmitting the hierarchical information to a technical architecture, wherein the technical architecture packages the hierarchical information; and transmitting the packaged hierarchical information to a hierarchical information system.

2. The method of claim 1, wherein the interface includes a coordinator that is able to receive the non-hierarchical information.

3. The method of claim 2, wherein the coordinator reads the map file to determine the attribute of the non-hierarchical information.

4. The method of claim 3, wherein the interface includes a searcher, wherein the coordinator utilizes the searcher to retrieve the attribute.

5. The method of claim 4, wherein the interface includes a writer, wherein coordinator tells the writer to add the attribute to the non-hierarchical information.

6. The method of claim 5, wherein the writer formats the attribute as defined by the map file and then appends the formatted attribute to the non-hierarchical information.

7. The method of claim 6, wherein the writer translates the non-hierarchical information into hierarchical information as a response to the appended attribute.

8. The method of claim 7, wherein the coordinator tells the writer to complete the non-hierarchical information and send it to the hierarchical information system.

9. The method of claim 1, wherein the hierarchical information is packaged in an IBM MQ Series.

10. The method of claim 1, wherein the hierarchical information is packaged in a Microsoft MSMQ.

11. The method of claim 1, further comprises processing the package hierarchical information by the hierarchical system.

12. The method of claim 11, further comprises returning an optional response from the hierarchical information system to the technical architecture via a message from a message queue.

13. The method of claim 12, further comprises retrieving the message at the technical architecture.

14. The method of claim 13, further comprises creating an optional responder at the technical architecture.

15. The method of claim 14, further comprises passing a data portion of the message to the optional responder.

16. The method of claim 15, further comprises instructing the optional responder to execute a process of returning the optional response.

17. The method of claim 16, further comprises creating an object at the responder, wherein the responder populates the object with data.

18. The method of claim 17, wherein the data includes a group identifier.

19. The method of claim 18, wherein the group identifier is a group enrollment of an insurance plan.

20. The method of claim 17, wherein the object is XML.

21. The method of claim 20, further comprises creating an XML message.

22. The method of claim 21, further comprises querying a Proxy Pool Manager for a secure proxy to an appropriate server.

23. The method of claim 22, further comprises utilizing the secure proxy to send the XML message to the non-hierarchical information system.

24. The method of claim 23, wherein the XML message is delivered to the non-hierarchical information system a return code is transmitted to the technical architecture and the message is deleted from the message queue.

25. A computerized method for translating to and from a hierarchical information system comprising:
   identifying a non-hierarchical information system containing non-hierarchical information stored in a non-hierarchical manner;
   receiving the non-hierarchical information into an interface;
   utilizing the interface to read a map file to determine an attribute of the non-hierarchical information;
   developing a translation map that identifies organizational and content based rules for translating the non-hierarchical information into hierarchical information based on the attribute;
   adding the attribute to the non-hierarchical information by utilizing the interface, wherein the adding comprises: formatting the attribute as defined by the map file and then appending the formatted attribute to the non-hierarchical information;
   in response to reading the attribute translating the non-hierarchical information into the hierarchical information;
   transmitting the hierarchical information to a hierarchical information system by utilizing a target system identifier of the interface, wherein the interface can deposit the hierarchical information to the hierarchical information system; and
   an optional responder of the hierarchical information system returns confirmation to the non-hierarchical information system that the hierarchical information system received the hierarchical information.

26. A system for translating to and from a hierarchical information system, comprising:
   means for identifying a non-hierarchical information system containing non-hierarchical information stored in a non-hierarchical manner;
   means for receiving the non-hierarchical information into an interface;
   means for utilizing the interface to read a map file to determine an attribute of the non-hierarchical information;
   means for developing a translation map that identifies organizational and, content based rules for translating the non-hierarchical information into hierarchical information based on the attribute;
   means for adding the attribute to the non-hierarchical information by utilizing the interface, wherein the adding comprises: formatting the attribute as defined by the map file and then appending the formatted attribute to the non-hierarchical information;
   in response to reading the attribute translating the non-hierarchical information into the hierarchical information;
   means for transmitting the hierarchical information to a technical architecture, wherein the technical architecture packages the hierarchical information; and
   means for transmitting the packaged hierarchical information to a hierarchical information system.

27. A system for translating to and from a hierarchical information system, comprising:
   a first computer system having a memory for storing non-hierarchical information in a non-hierarchical information system;
   an interface coupled to the first computer system, the interface having means for identifying the non-hierarchical information system containing the non-hierarchical information stored in a non-hierarchical manner, receiving the non-hierarchical information into an interface, utilizing the interface to read a map file to determine an attribute of the non-hierarchical information, developing a translation map that identifies organizational and content based rules for translating the non-hierarchical information into hierarchical information based on the attribute, adding the attribute to the non-hierarchical information by utilizing the interface, wherein the adding comprises: formatting the attribute as defined by the map file and then appending the formatted attribute to the non-hierarchical information, in response to reading the attribute translating the non-hierarchical information into the hierarchical information, transmitting the hierarchical information to a technical architecture, wherein the technical architecture packages the hierarchical information, and transmitting the packaged hierarchical information to a hierarchical information system; and
   a second computer system coupled to the interface, the second computer system having a memory for storing the hierarchical information in a hierarchical information system.

28. A method for translating to and from a hierarchical information system, comprising:
   receiving an object model into an interface;
   utilizing the interface to read a map file to determine an attribute of the object model;
   developing a translation map that identifies organizational and content based rules for translating the object model into a legacy message based on the attribute;
   adding the attribute to the object model by utilizing the interface, wherein the adding comprises: formatting the attribute as defined by the map file and then appending the formatted attribute to the object model;
   in response to reading the attribute translating the object model into the legacy message;
   transmitting the legacy message to a technical architecture, wherein the technical architecture packages the legacy message; and
   transmitting the packaged legacy message to a legacy system.

29. A method for translating to and from a hierarchical information system, comprising;
   receiving a legacy message into an interface;
   utilizing the interface to read a map file to determine an attribute of the object model;
   developing a translation map that identifies organizational and content based rules for translating the legacy message into an object model based on the attribute;
   adding the attribute to the legacy message by utilizing the interface, wherein the adding comprises: formatting the attribute as defined by the map file and then appending the formatted attribute to the legacy message;

in response to reading the attribute translating the legacy message into the object model;

transmitting the object model to a technical architecture, wherein the technical architecture packages the object model; and transmitting the packaged object model to an object system.

30. A method for translating to and from a hierarchical information system, comprising:

identifying a hierarchical information system containing hierarchical information stored in a hierarchical manner;

receiving the hierarchical information into an interface;

utilizing the interface to read a map file to determine an attribute of the hierarchical information;

developing a translation map that identifies organizational and content based rules for translating the hierarchical information into non-hierarchical information based on the attribute;

adding the attribute to the hierarchical information by utilizing the interface, wherein the adding comprises: formatting the attribute as defined by the map file and then appending the formatted attribute to the hierarchical information;

in response to reading the attribute translating the hierarchical information into the non-hierarchical information;

transmitting the non-hierarchical information to a technical architecture, wherein the technical architecture packages the non-hierarchical information; and transmitting the packaged non-hierarchical information to a non-hierarchical information system, wherein the non-hierarchical information is extensible to other applications.

31. A computerized method for translating to and from a hierarchical information system comprising:

identifying a hierarchical information system containing hierarchical information stored in a hierarchical manner;

receiving the hierarchical information into an interface;

utilizing the interface to read a map file to determine an attribute of the hierarchical information;

developing a translation map that identifies organizational and content based rules for translating the hierarchical information into non-hierarchical information based on the attribute;

adding the attribute to the hierarchical information by utilizing the interface, wherein the adding comprises: formatting the attribute as defined by the map file and then appending the formatted attribute to the hierarchical information;

in response to reading the attribute translating the hierarchical information is translated into the non-hierarchical information;

transmitting the non-hierarchical information to a non-hierarchical information system, by utilizing a target system identifier of the interface, wherein the interface can deposit the non-hierarchical information to the non-hierarchical information system; and an optional responder of the non-hierarchical information system returns confirmation to the hierarchical information system that the non-hierarchical information system received the non-hierarchical information.

32. A system for translating to and from a hierarchical information system, comprising:

means for identifying a hierarchical information system containing hierarchical information stored in a hierarchical manner;

means for receiving the hierarchical information into an interface;

means for utilizing the interface to read a map file to determine an attribute of the hierarchical information;

means for developing a translation map that identifies organizational and content based rules for translating the hierarchical information into non-hierarchical information based on the attribute;

means for adding the attribute to the hierarchical information by utilizing the interface, wherein the adding comprises: formatting the attribute as defined by the map file and then appending the formatted attribute to the hierarchical information;

in response to reading the attribute translating the hierarchical information into the non-hierarchical information;

means for transmitting the non-hierarchical information to a technical architecture, wherein the technical architecture packages the non-hierarchical information; and means for transmitting the packaged non-hierarchical information to a non-hierarchical information system, wherein the non-hierarchical information is extensible to other applications.

33. A system for translating to and from a hierarchical information system, comprising:

a first computer system having a memory for storing hierarchical information in a hierarchical information system;

an interface coupled to the first computer system, the interface having means for identifying the hierarchical information system containing the hierarchical information stored in a hierarchical manner, receiving the hierarchical information into an interface, utilizing the interface to read a map file to determine an attribute of the hierarchical information, developing a translation map that identifies organizational and content based rules for translating the hierarchical information into non-hierarchical information based on the retrieved attribute, adding the attribute to the hierarchical information by utilizing the interface, wherein the adding comprises: formatting the attribute as defined by the map file and then appending the formatted attribute to the hierarchical information, in response to reading the attribute translating the hierarchical information into the non-hierarchical information, transmitting the non-hierarchical information to a technical architecture, wherein the technical architecture packages the non-hierarchical information, and transmitting the packaged hierarchical information to a non-hierarchical information system, wherein the non-hierarchical information is extensible to other applications; and a second computer system coupled to the interface, the second computer system having a memory for storing the non-hierarchical information in a non-hierarchical information system.

34. A method for translating to and from a hierarchical information system, comprising:

identifying a non-hierarchical information system containing non-hierarchical information stored in a non-hierarchical manner;

receiving the non-hierarchical information into an interface, wherein the interface includes a searcher, a coordinator and a writer;

utilizing the coordinator to read a map file to determine an attribute of the non-hierarchical information;

developing a translation map that identifies organizational and content based rules for translating the non-hierarchical information into hierarchical information based on the searcher retrieving the attribute;

adding the attribute to the non-hierarchical information by utilizing the writer, wherein the adding comprises: formatting the attribute as defined by the map file and then appending the formatted attribute to the non-hierarchical information;

in response to appending the attribute translating the non-hierarchical information into the hierarchical information;

transmitting the hierarchical information to a technical architecture, wherein the technical architecture packages the hierarchical information; and transmitting the packaged hierarchical information to a hierarchical information system.

* * * * *